United States Patent
Hamanaga et al.

(10) Patent No.: US 7,283,813 B2
(45) Date of Patent: Oct. 16, 2007

(54) MOBILE TERMINAL AND INCOMING/OUTGOING CALL HISTORY MANAGEMENT METHOD

(75) Inventors: Ayaka Hamanaga, Hiroshima (JP); Eiji Kawahara, Hiroshima (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/524,852

(22) PCT Filed: Aug. 27, 2004

(86) PCT No.: PCT/JP2004/012808

§ 371 (c)(1),
(2), (4) Date: Feb. 18, 2005

(87) PCT Pub. No.: WO2005/025191

PCT Pub. Date: Mar. 17, 2005

(65) Prior Publication Data

US 2006/0025112 A1    Feb. 2, 2006

(30) Foreign Application Priority Data

Sep. 2, 2003   (JP)   ............................. 2003-310159

(51) Int. Cl.
H04M 3/42    (2006.01)
H04L 12/58    (2006.01)
H04B 1/38    (2006.01)

(52) U.S. Cl. ................. 455/415; 455/412.1; 455/412.2; 455/567

(58) Field of Classification Search ................ 455/415, 455/414.3, 379, 42.1, 414.2, 45.8, 432.3, 455/550.1, 567, 412.1, 412.2; H04M 1/57
See application file for complete search history.

(56) References Cited

U.S. PATENT DOCUMENTS 5,959,661 A * 9/1999 Isono ...................... 348/14.05

(Continued)

FOREIGN PATENT DOCUMENTS

JP    6-224991    8/1994

(Continued)

OTHER PUBLICATIONS

U.S. Appl. No. 10/609,483, filed Jun. 2003, Kimitaka.*

(Continued)

Primary Examiner—Lester G. Kincaid
Assistant Examiner—Marisol Figueroa
(74) Attorney, Agent, or Firm—Wenderoth, Lind & Ponack, L.L.P.

(57)   ABSTRACT

An incoming/outgoing call detection section detects an incoming or outgoing phone call from or to another mobile terminal. An information acquisition section acquires related information concerning an incoming or outgoing call in response to detection of the incoming or outgoing call by the detection section. An incoming/outgoing call history generation section generates history information in which the related information acquired by the information acquisition section is kept in association with at least a telephone number of the incoming or outgoing call. An incoming/outgoing call history storing section stores the history information generated by the history generation section. An incoming/outgoing call history notification section notifies to a user of the mobile terminal the related information contained in the history information, in response to an incoming or outgoing call from or to the telephone number contained in the history information stored in the incoming/outgoing call history storing section.

10 Claims, 18 Drawing Sheets

U.S. PATENT DOCUMENTS

| | | | |
|---|---|---|---|
| 6,301,338 B1 * | 10/2001 | Makela et al. | 379/88.21 |
| 6,347,225 B1 * | 2/2002 | Nishiyama | 455/412.1 |
| 6,681,004 B2 * | 1/2004 | Strubbe et al. | 379/142.06 |
| 6,980,794 B1 * | 12/2005 | Hamada et al. | 455/407 |
| 7,010,288 B2 * | 3/2006 | Brown et al. | 455/415 |
| 2001/0031633 A1 | 10/2001 | Tuomela et al. | 455/415 |
| 2001/0042103 A1 * | 11/2001 | Tomari et al. | 709/206 |
| 2002/0010008 A1 * | 1/2002 | Bork et al. | 455/567 |
| 2003/0100295 A1 | 5/2003 | Sakai et al. | 455/417 |
| 2003/0112332 A1 * | 6/2003 | Silvester | 348/113 |
| 2003/0153372 A1 * | 8/2003 | Shimamura et al. | 455/575 |
| 2005/0130631 A1 * | 6/2005 | Maguire et al. | 455/414.1 |
| 2005/0170817 A1 * | 8/2005 | Matsutaka | 455/415 |

FOREIGN PATENT DOCUMENTS

| | | | |
|---|---|---|---|
| JP | 6-252988 | | 9/1994 |
| JP | 2005012296 A | * | 1/2005 |
| WO | WO-03/056789 | * | 6/2003 |
| WO | 03/056789 | | 7/2003 |

OTHER PUBLICATIONS

U.S. Appl. No. 10/369,329, filed Feb. 2003, Koji Okamura.*
U.S. Appl. No. 09/726,362, filed Nov. 2000, Urpo Tuomela.*
U.S. Appl. No. 10/500,269, filed Dec. 2002, Michael Maguire.*
U.S. Appl. No. 09/775,738, filed Feb. 2001, Naoya Suzuki.*
Abstract translation for Japanese document JP 2005-012296.*

* cited by examiner

F I G. 5

| OUTGOING CALL HISTORY INFORMATION | | | | | | | |
|---|---|---|---|---|---|---|---|
| TELEPHONE NUMBER | NAME | IMAGE | SOUND | LOCATION | CH | OPEN/CLOSE | TIME OF CALLING |
| 090-XXXX-XXXX | SUGI | ABC.jpg | — | W35,N135 | — | — | 2004/07/07 18:30 |
| 090-YYYY-YYYY | MATSU | EFG.mpg | hij.wav | — | — | OPEN | 2004/07/04 13:00 |
| 090-ZZZZ-ZZZZ | MASA | — | — | IP:123,456 | 4 | OPEN | 2004/06/27 08:15 |

FIG. 8

| ID | ANSWERING MESSAGE |
|---|---|
| 1 | LET ME CALL YOU BACK RIGHT AWAY. |
| 2 | I WILL NOT ANSWER THE CALL SINCE YOUR NUMBER IS NOT INDICATED. |
| 3 | I AM IN A REGULAR MEETING UNTIL 15 O'CLOCK. |
| 4 | I AM ON A TRAIN TO GO TO WORK. |

FIG. 9

| INCOMING CALL HISTORY INFORMATION | | | | |
|---|---|---|---|---|
| TELEPHONE NUMBER | NAME | MESSAGE ID | REDIAL FLAG | TIME OF CALLING |
| 090-XXXX-XXXX | SUGI | 3 | 0 | 2004/07/07 18:30 |
| 090-YYYY-YYYY | MATSU | — | — | 2004/07/04 13:00 |
| 090-ZZZZ-ZZZZ | MASA | 4 | 1 | 2004/06/27 08:15 |
| ⋮ | | | | |

FIG. 14

| ID | ANSWERING MESSAGE | ALARMING DATE | ALARMING TIME | ALARMING METHOD |
|---|---|---|---|---|
| 1 | LET ME CALL YOU BACK RIGHT AWAY. | — | 5 MINUTES LATER | SOUND EFFECT 2 + ANIMATION |
| 2 | I WILL NOT ANSWER THE CALL SINCE YOUR NUMBER IS NOT INDICATED. | — | — | — |
| 3 | I AM IN A REGULAR MEETING UNTIL 15 O'CLOCK. | 2004/7/11 | 15:30 | MELODY 5 |
| 4 | I AM ON A TRAIN TO GO TO WORK. | — | 8:40 | VIBRATION 1 |

MOBILE TERMINAL AND INCOMING/OUTGOING CALL HISTORY MANAGEMENT METHOD

TECHNICAL FIELD

The present invention relates to a mobile terminal and an incoming/outgoing call history management method. More particularly, the present invention relates to a mobile terminal having a function of storing a telephone number of another terminal together with a time of reception/calling; a method for managing an incoming/outgoing call history thereof; a computer-readable program for executing the method; and a recording medium having the program recorded thereon.

BACKGROUND ART

With the prevalence of telephone technologies in recent years, there have been proposed wireless cellular phones and wired telephone machines which are provided with various functions. For example, there are practical implementations of functions to be used in the case where a receiver of a call cannot immediately answer the call. One such function allows a user, who is prevented from using his or her own voice to answer a call due to a circumstantial reason (e.g., the user being in a meeting or on a train), to answer the call with a pre-registered voice message, without causing any disturbance to others. Another such function, at a receiving-end terminal, allows an arbitrary method of calling or answering to be set with respect to each caller, such that the method of calling or answering as set is used when connecting to any preset caller.

However, according to conventional techniques such as the aforementioned functions, a message which was used in answering a received phone call was not stored in association with a telephone number of the calling-end terminal. Therefore, the user of the receiving-end terminal may forget which answering message has been sent to the calling-end terminal, and possibly make a blunder later on.

For example, consider a case where one calls back to someone because of having been unable to answer a received call, where an answering message saying "I am in a meeting" was sent. In this case, it would lead to the suspicion on the part of the other person if the person calling back says that he or she was not able to answer the last phone call because of "being on a train", instead of the more-proper "being in a meeting". Therefore, in such a case, before calling back, one needs to remember which answering message was previously sent. In particular, if the other person happens to call back first, one needs to instantaneously recall what was the answering message.

Therefore, an object of the present invention is to provide a mobile terminal and an incoming/outgoing call history management method which contribute to a smooth dialog by outputting an answering message which, at the time of an incoming or outgoing phone call or the like, was previously sent to a person on the other end of the phone call for facilitating confirmation.

SUMMARY OF THE INVENTION

The present invention is directed to a mobile terminal for managing an incoming/outgoing call history of phone calls. To achieve the above object, the mobile terminal according to the present invention includes a detection section, an information acquisition section, a history generation section, a history storing section, and a history notification section.

The detection section is operable to detect an incoming or outgoing phone call which has occurred between the mobile terminal and another mobile terminal. The information acquisition section is operable to acquire related information concerning an incoming or outgoing call in response to detection of the incoming or outgoing call by the detection section. The history generation section is operable to generate history information in which the related information acquired by the information acquisition section is kept in association with at least a telephone number of the incoming or outgoing call. The history storing section is operable to store the history information generated by the history generation section. The history notification section is operable to notify to a user of the mobile terminal the related information contained in the history information, in response to an incoming or outgoing call from or to the telephone number contained in the history information stored in the history storing section.

A preferable structure further comprises a device section operable to acquire environment information concerning surroundings of the mobile terminal or a state of the mobile terminal. The information acquisition section acquires, as the related information, the environment information acquired from the device section at the time of the incoming or outgoing call. The history storing section stores the environment information acquired by the information acquisition section in association with the telephone number of the incoming or outgoing call. Typical environment information is still image information, moving picture information, or audio information representing the surroundings of the mobile terminal; or position information, viewed program information, or open/close information representing the state of the mobile terminal, and the like.

Another preferable structure further comprises a message storing section operable to store a plurality of answering messages. As the related information, the information acquisition section acquires from the message storing section an answering message used to answer an incoming call. The history storing section stores the answering message acquired by the information acquisition section in association with a telephone number of the incoming call.

In one embodiment, the history storing section further stores information indicating whether the telephone number contained in the history information has been redialed or not. At the time of the incoming or outgoing phone call, the history notification section notifies to the user of an answering message associated with a piece of history information containing the telephone number only if the telephone number has not yet been redialed. Alternatively, in the case where themessage storing section stores alarm information specifying a time at which to notify with an alarm in connection with the answering message, the history notification section notifies to the user an answering message associated with a piece of history information which has reached the time specified by the alarm information. In this case, the notification may be made only with respect to a telephone number that has not yet been redialed.

If the number of pieces of history information stored in the history storing section exceeds a predetermined maximum number, it is preferable that a piece of history information which contains an already redialed telephone number and which has an oldest time of reception/calling is automatically deleted. Alternatively, when a piece of history information which contains a telephone number that has not yet been redialed is nominated for deletion, a message may be presented to the user to seek an approval to delete the piece of history information.

The processes to be performed by the component elements of the mobile terminal described above may be regarded as an incoming/outgoing call history management method defining a sequence of processing steps. Such a method may be provided in the form of a program for causing a computer to execute the sequence of processing steps. Such a program may be introduced into the computer in a recorded form on a computer readable recording medium. Alternatively, the functional block composing the mobile terminal described above may be implemented as an LSI, which is an integrated circuit.

Thus, according to the present invention, environment information and/or an answering message are stored in association with an incoming or outgoing phone call. As a result, a user can easily recognize an environment which the mobile terminal was in when an incoming or outgoing phone call occurred, and/or which an answering message was used to answer a previous incoming phone call. Consequently, at the next phone call, the user can conduct a smooth dialog by referring to the previous telephone environment and/or answering message. Moreover, an arbitrary alarm can be set with respect to an answering message so that an alarm is notified to the user at an alarming time unless the user has already redialed. Furthermore, any piece of incoming call history information pertaining to a person to whom the user has not redialed yet can be prevented from being automatically deleted. Thus, failure to redial to a person to whom an answering message was sent can be prevented.

BRIEF DESCRIPTION OF THE DRAWINGS

FIG. 5 is a diagram illustrating examples of outgoing call history information which is stored in an incoming/outgoing call history storing section 34.

FIG. 8 is an exemplary table of answering messages.

FIG. 9 is a diagram illustrating examples of incoming call history information which is stored in an incoming call history storing section 64.

FIG. 14 is a table illustrating an exemplary relationship between answering messages and alarming information.

BEST MODE FOR CARRYING OUT THE INVENTION

Hereinafter, embodiments of the present invention will be described with reference to the figures.

Figure 1:
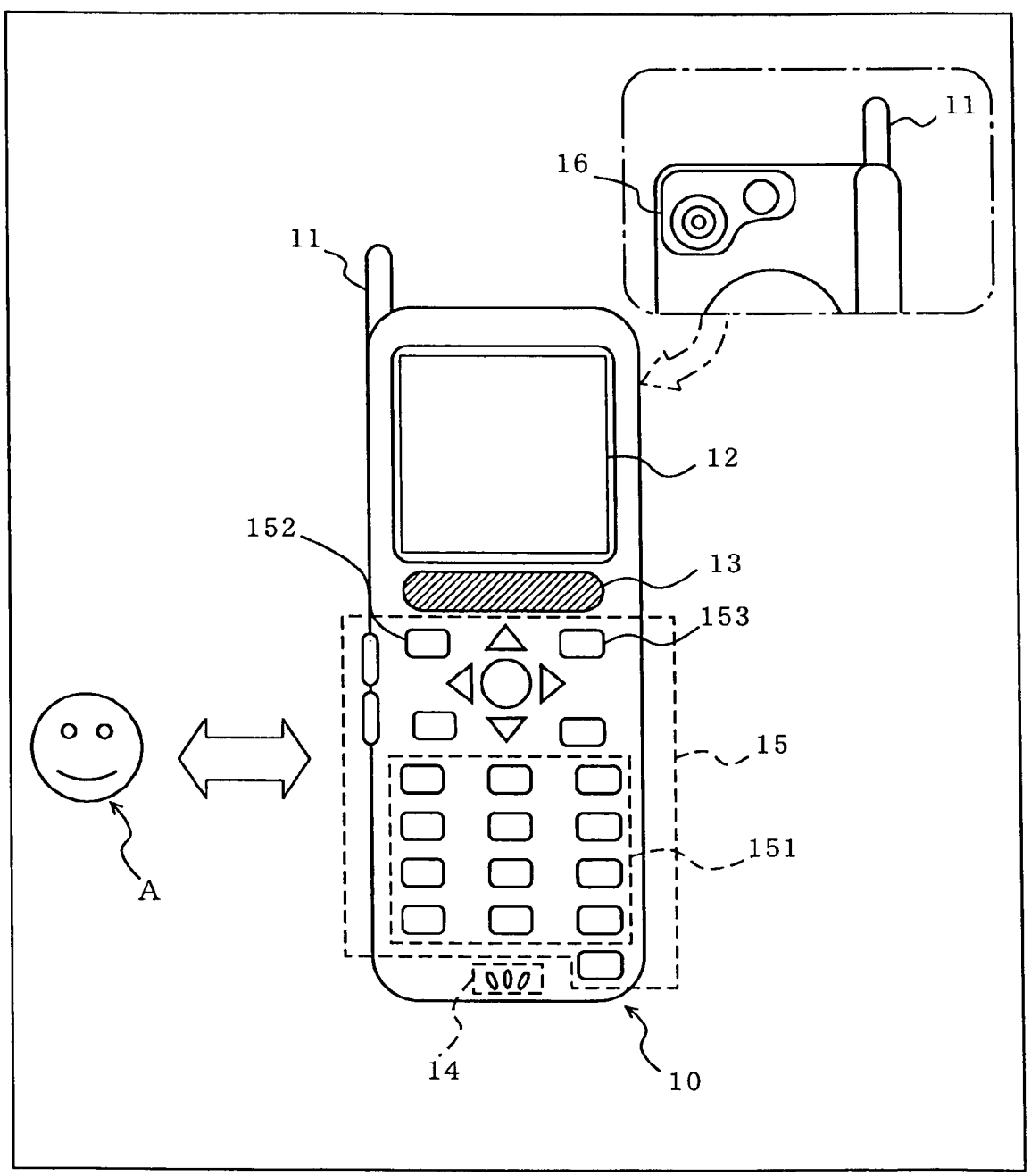
FIG. 1 is a diagram showing an outer appearance of a cellular phone as an exemplary mobile terminal 10 according to the present invention.

A mobile terminal 10 according to the present invention is a terminal having a function of managing an incoming/outgoing call history of phone calls exchanged with another mobile terminal, and may typically be a cellular phone as exemplified in FIG. 1. In FIG. 1, the mobile terminal 10 comprises an antenna 11, a screen 12, a loudspeaker 13, a microphone 14, buttons 15, and an imaging section 16.

The antenna 11 receives an electric signal which is transmitted through space, and sends out an electric signal into space. The screen 12 displays images. The loudspeaker 13 mainly outputs, in audio form, the content of a speech of a person on the other end of a phone call. The microphone 14 mainly converts the content of a speech of a user A to an audio signal. The buttons 15 include several buttons to be manipulated by the hands of the user A, such as: buttons 151 for inputting a telephone number; an answering message button 152 for performing a process of sending out a predetermined answering message in response to an incoming call; an incoming/outgoing call history button 153 for allowing an incoming/outgoing call history to be displayed on the screen 12; and the like. The arrangement of the buttons and their functions are not limited to the illustration of FIG. 1. The imaging section 16 may be a camera, for example, which takes in an image of the surroundings of the mobile terminal 10 as digital image information. The present embodiment illustrates an example where the imaging section 16 is placed on the rear face of (as shown by a dot-dash line) of the mobile terminal 10.

Figure 2:
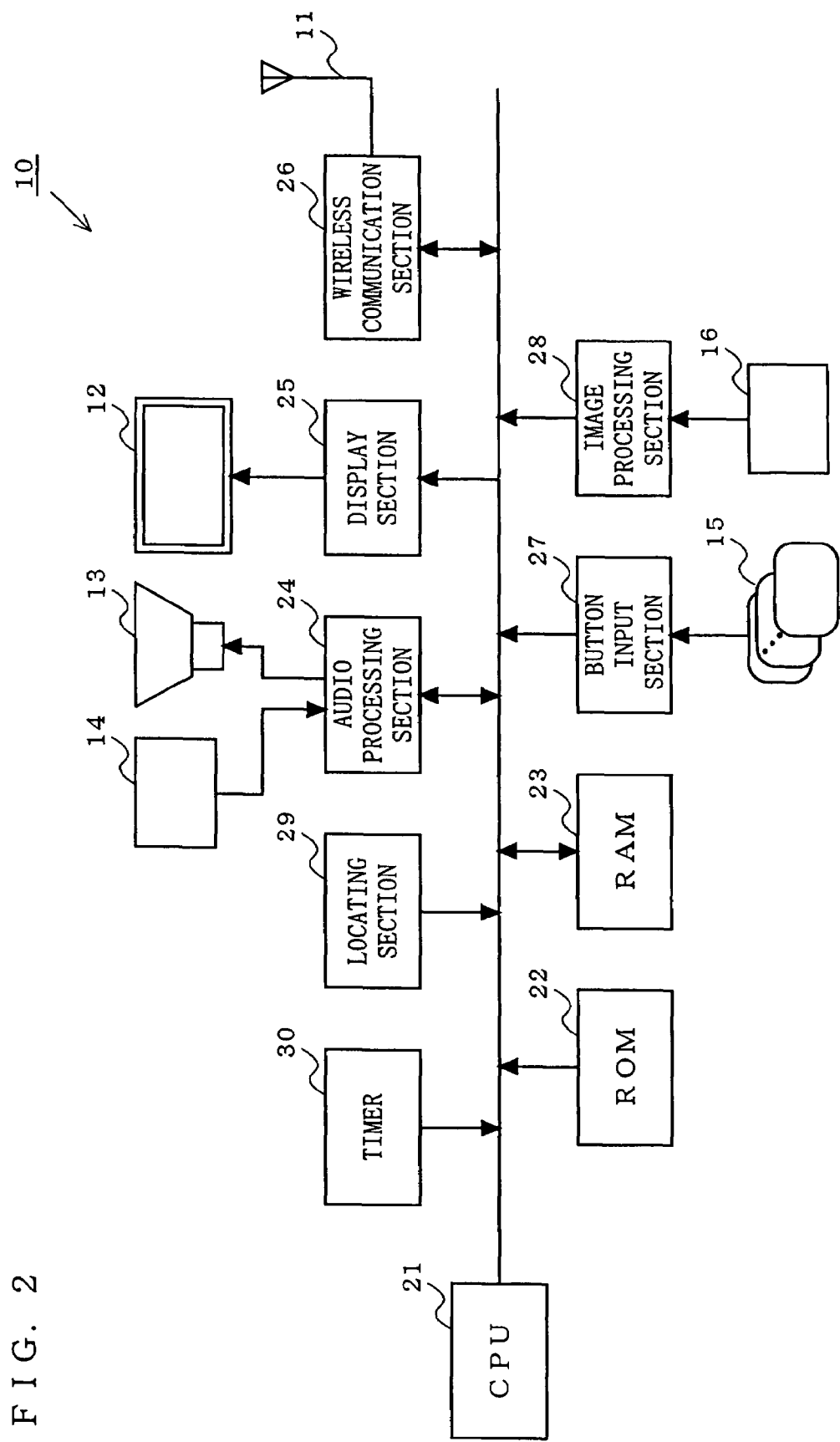
FIG. 2 is a diagram illustrating a typical hardware structure for implementing the mobile terminal 10 according to the present invention.

FIG. 2 is a diagram illustrating a typical hardware structure for implementing the mobile terminal 10 according to the present invention. As shown in FIG. 2, the mobile terminal 10 is composed of interconnected elements, including: a CPU 21 for controlling the entire terminal; a ROM 22 and a RAM 23 functioning as storage sections; an audio processing section 24 which is connected to the loudspeaker 13 and the microphone 14; a display section 25 for displaying images on the screen 12; a wireless communication section 26 for performing communications through the antenna 11; a button input section 27 including the buttons 15; an image processing section 28 which is connected to the imaging section 16; a locating section 29 for measuring a current location; and a timer 30 for keeping track of the current time. The microphone 14, the imaging section 16, and the locating section 29, for example, are devices operable to acquire environment information concerning the surroundings or the state of the mobile terminal 10.

In the ROM 22, a software program for providing a service(s) is stored. The CPU 21 executes the program stored in the ROM 22, and performs a data write or update to the RAM 23 as necessary. As a result of executing this program, the CPU 21 outputs audio to the user A through the loudspeaker 13 via the audio processing section 24, and outputs an image on the screen 12 via the display section 25. Moreover, the CPU 21 accepts key inputs from the user A via the buttons 15 connected to the button input section 27. Furthermore, the CPU 21 performs communications via the antenna 11, which is connected to the wireless communication section 26, to receive or transmit data which is necessary for the service(s).

The locating section 29 derives the current location of the mobile terminal 10 by radio-aids-to-navigation and/or autonomous navigation. A typical example of the locating section 29 as such is a GPS (Global Positioning System) receiver. A GPS receiver derives the current location of the mobile terminal 10 based on information which is sent from artificial satellites composing the GPS. The current location is typically represented by using a latitude coordinate and a longitude coordinate. Alternatively, the locating section 29 may derive the current location based on information which is sent from a PHS (Personal Handy-phone System) base station, for example. Alternatively, the locating section 29 may derive the current location based on information (an IP address or network name) which is sent from a server of a short-distance wireless communication network (e.g., bluetooth or wireless LAN), for example. Further alternatively, the locating section 29 may derive the current location based on information which can be obtained from a gate of a non-contact type communication network (information of a service area in which the mobile terminal 10 is currently located), for example. Although the present embodiment illustrates the locating section 29 as being internalized in the mobile terminal 10, the present invention is not limited thereto. The locating section 29 may be a module which is detachable from the mobile terminal 10.

The mobile terminal 10 according to the present invention has been described above in terms of the hardware structure thereof. Next, a unique incoming/outgoing call history management method according to the present invention, which is performed by the mobile terminal 10 by utilizing at least a portion of the above-described hardware structure, will be described in terms of software structure. Four embodiments thereof will be illustrated below, as differentiated by the type of related information that is managed as the incoming/outgoing call history and the method in which the related information is utilized.

First Embodiment

Figure 3:
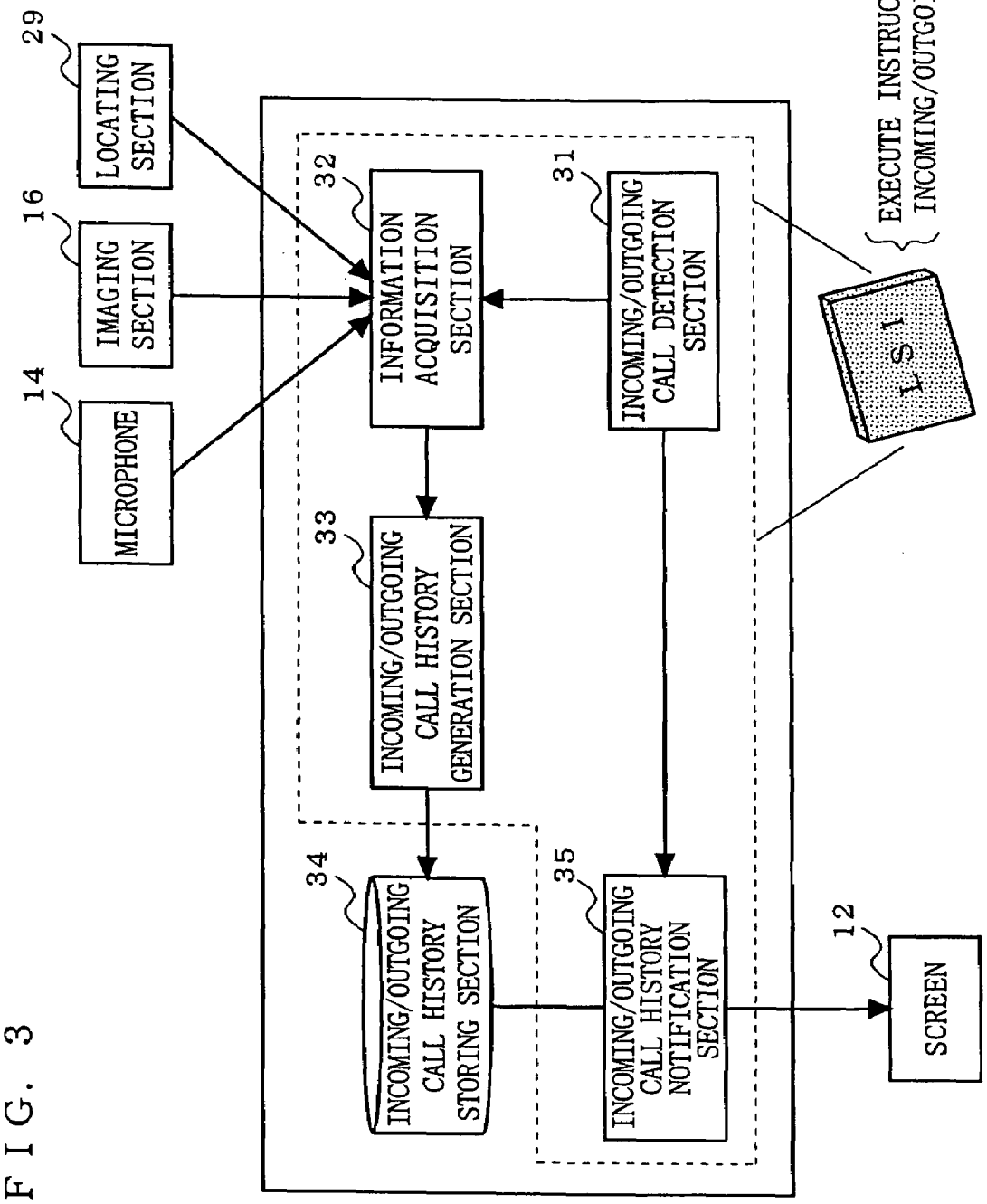
FIG. 3 is a diagram illustrating a software structure of a mobile terminal 10 utilizing an incoming/outgoing call history management method according to a first embodiment of the present invention.
Figure 4:
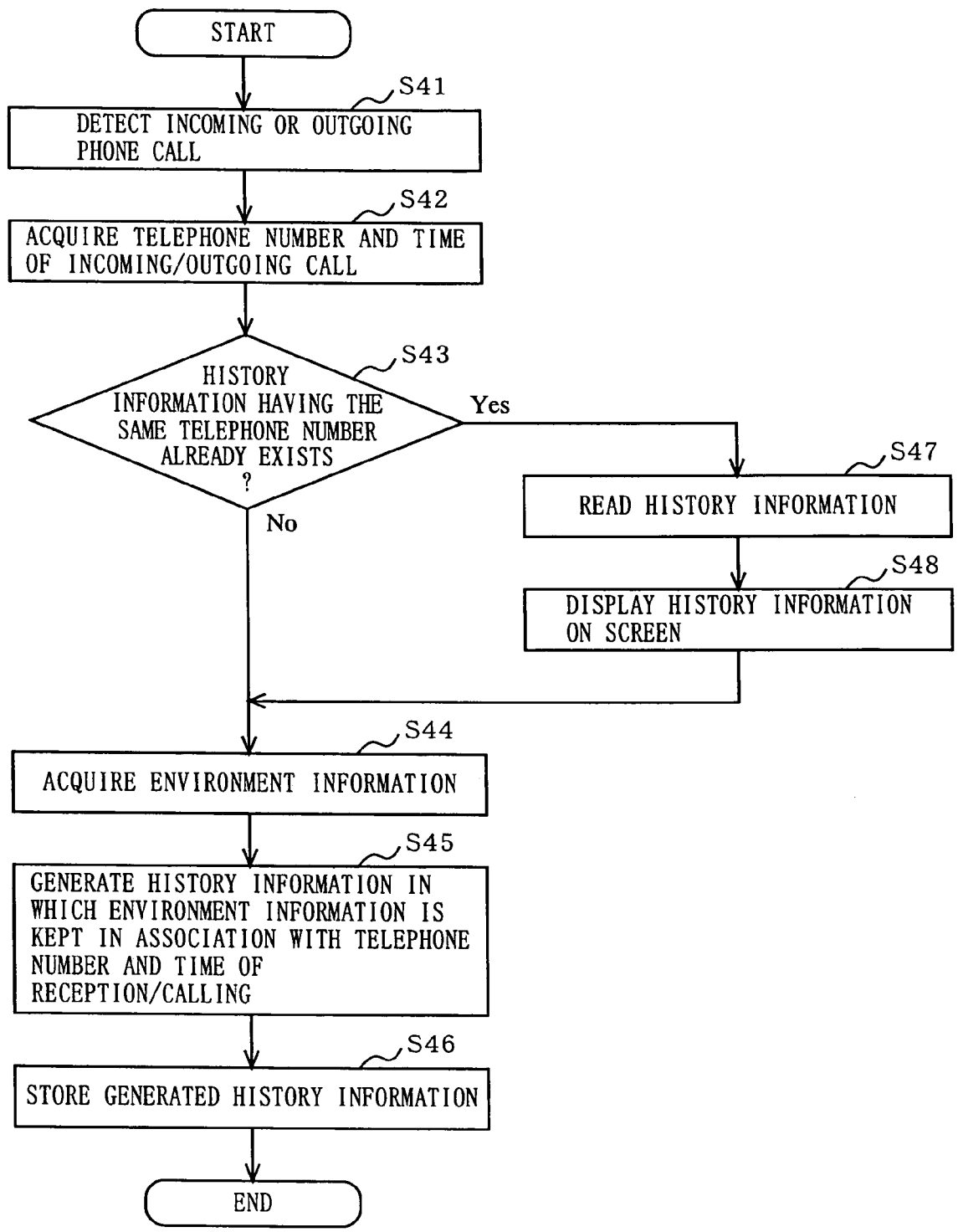
FIG. 4 is a flowchart illustrating processing steps of the incoming/outgoing call history management method according to the first embodiment of the present invention.

FIG. 3 is a diagram illustrating a software structure of the mobile terminal 10 utilizing an incoming/outgoing call history management method according to a first embodiment of the present invention. A program stored in the ROM 22 of FIG. 2 is read by the CPU 21 to realize functions of the incoming/outgoing call detection section 31, the information acquisition section 32, the incoming/outgoing call history generation section 33, the incoming/outgoing call history storing section 34, and the incoming/outgoing call history notification section 35. FIG. 4 is a flowchart illustrating processing steps of the incoming/outgoing call history management method according to the first embodiment of the present invention.

The incoming/outgoing call detection section 31 detects an outgoing phone call from the mobile terminal 10 or an incoming phone call to the mobile terminal 10 (step S41). Upon detecting an incoming or outgoing phone call, the incoming/outgoing call detection section 31 acquires the number (or owner's name) of the phone call and the time at which the phone call was received or made (hereinafter referred to as the "time of reception/calling" of the phone call) (step S42). In response to the detection of an incoming/outgoing call by the incoming/outgoing call detection section 31, the information acquisition section 32 acquires related information concerning the detected incoming/outgoing call (step S44). The "related information" as described in the first embodiment is environment information which identifies the surroundings or the state of the mobile terminal 10 at the time of detection, and may typically comprise the following information.

Firstly, the related information may be image information which is obtained by taking a still image or moving pictures of the surroundings of the mobile terminal 10. The image information can be acquired by means of the imaging section 16. Secondly, the related information may be sound information which is obtained by recording the sounds and soundscape of the surroundings of the mobile terminal 10. The sound information can be acquired by means of the microphone 14. Thirdly, the related information may be position information which identifies the current location of the mobile terminal 10. The position information can be acquired by means of the locating section 29. Furthermore, in the case where the mobile terminal 10 is of a type having an internalized TV tuner, the related information may be information concerning a channel which is being viewed. In the case where the mobile terminal 10 is of a type which folds up, rotates, slides, or goes through any combination of such actions, the related information may be information (open/close information) concerning the state of folding, rotating, sliding, or the like. The related information to be acquired by the information acquisition section 32 may be any one of the above types of information, or may be a combination of any two types.

The incoming/outgoing call history generation section 33 generates history information, in which the environment information acquired by the information acquisition section 32 is kept in association with the telephone number and the time of reception/calling detected by the incoming/outgoing call detection section 31 (step S45). The incoming/outgoing call history generation section 33 stores the generated history information to the incoming/outgoing call history storing section 34 (step S46). FIG. 5 is a diagram illustrating examples of outgoing call history information which is stored in the incoming/outgoing call history storing section 34. Data 51 shown in FIG. 5 indicates that still image information (ABC.JPG) and position information (west longitude 35°, north latitude 135°) are stored as the environment information at the time an outgoing call was made to 090-XXXX-XXXX (owner: SUGI) on Jul. 7, 2004, 18:30. Although not explicitly shown, it is to be understood that the incoming call history information is stored in a similar manner to the outgoing call history information. Apart from the environment information which is kept in association in a manner unique to the present invention, storing the telephone number of an incoming call and a time of reception together as a piece of incoming call history information is well known in the art.

The history information which has been thus stored may be utilized as follows, for example. If the incoming/outgoing call detection section 31 detects an incoming or outgoing phone call to or from the mobile terminal 10 and acquires a telephone number (or owner's name) therefrom (steps S41 and S42), the incoming/outgoing call history notification section 35 checks whether a piece of history information corresponding to this telephone number is already stored in the incoming/outgoing call history storing section 34 (step S43). If the result of the checking indicates that such a piece of history information already exists, the incoming/outgoing call history notification section 35 reads the piece of history information from the incoming/outgoing call history storing section 34 and causes it to be displayed on the screen 12, thus notifying the content of the history information to the user (steps S47 and S48). If the environment information is sound information, the information is notified to the user via the loudspeaker 13.

Thus, in accordance with the incoming/outgoing call history management method of the first embodiment, environment information is retained in association with an incoming or outgoing phone call, thus allowing the user to know the environment which the mobile terminal was in when the incoming or outgoing phone call occurred. Therefore, the user can easily confirm, for example, which server the user was communicating with or which service area the user was in at the time the incoming or outgoing phone call occurred. Moreover, next time calling the same telephone number, the user can refer to this information to know which environment the user was in at the time the incoming or outgoing phone call occurred. In the above-described example, a telephone number is utilized as ID information for identifying a person on the other end of the communication as well as a mobile terminal possessed by that person. Any ID information other than a telephone number may be used for similar purposes, e.g., a mail address, an IP address, a MAC address, or the like.

Second Embodiment

Figure 6:
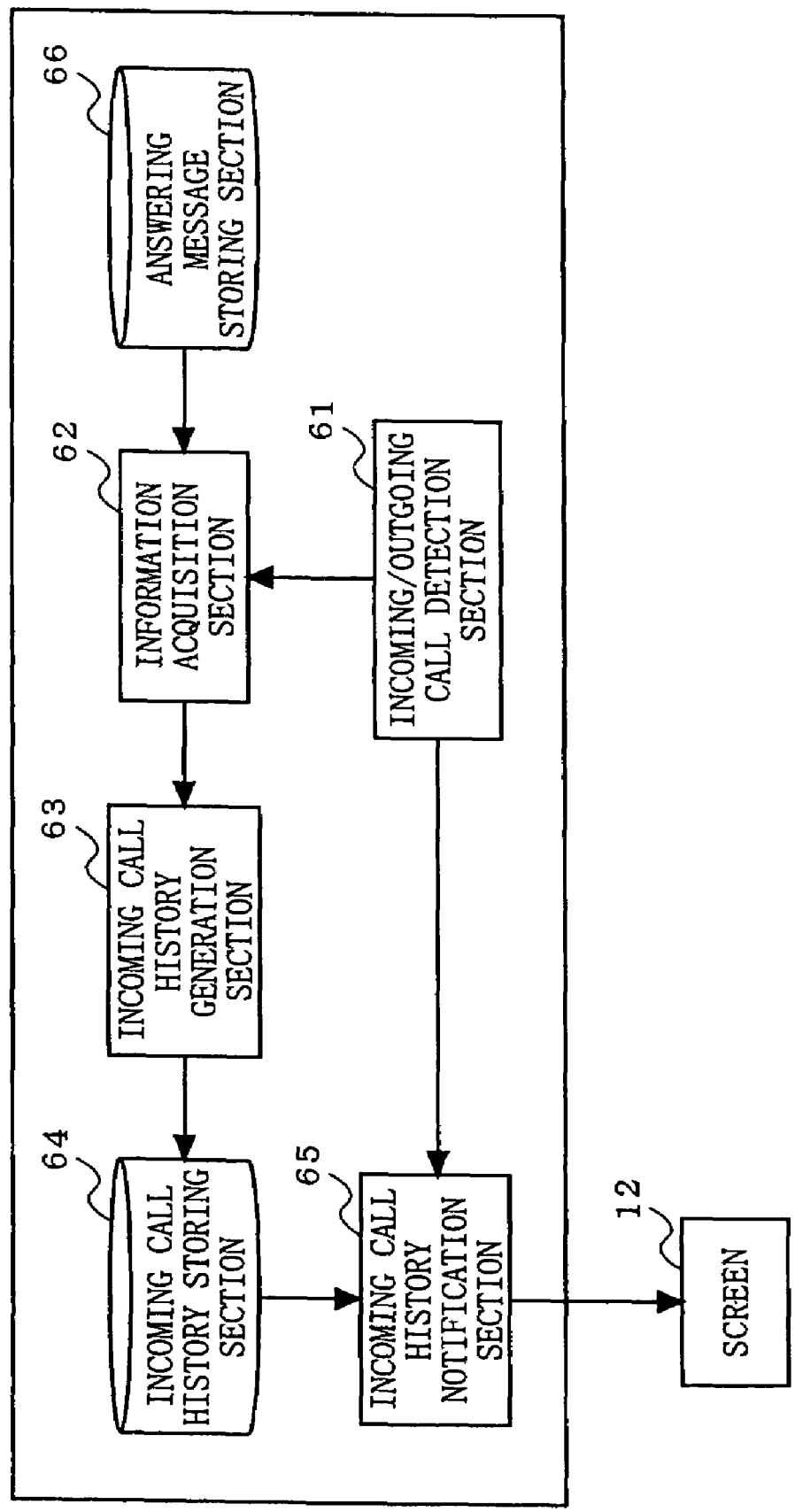
FIG. 6 is a diagram illustrating a software structure of a mobile terminal utilizing an incoming/outgoing call history management method according to a second embodiment of the present invention.
Figure 7:
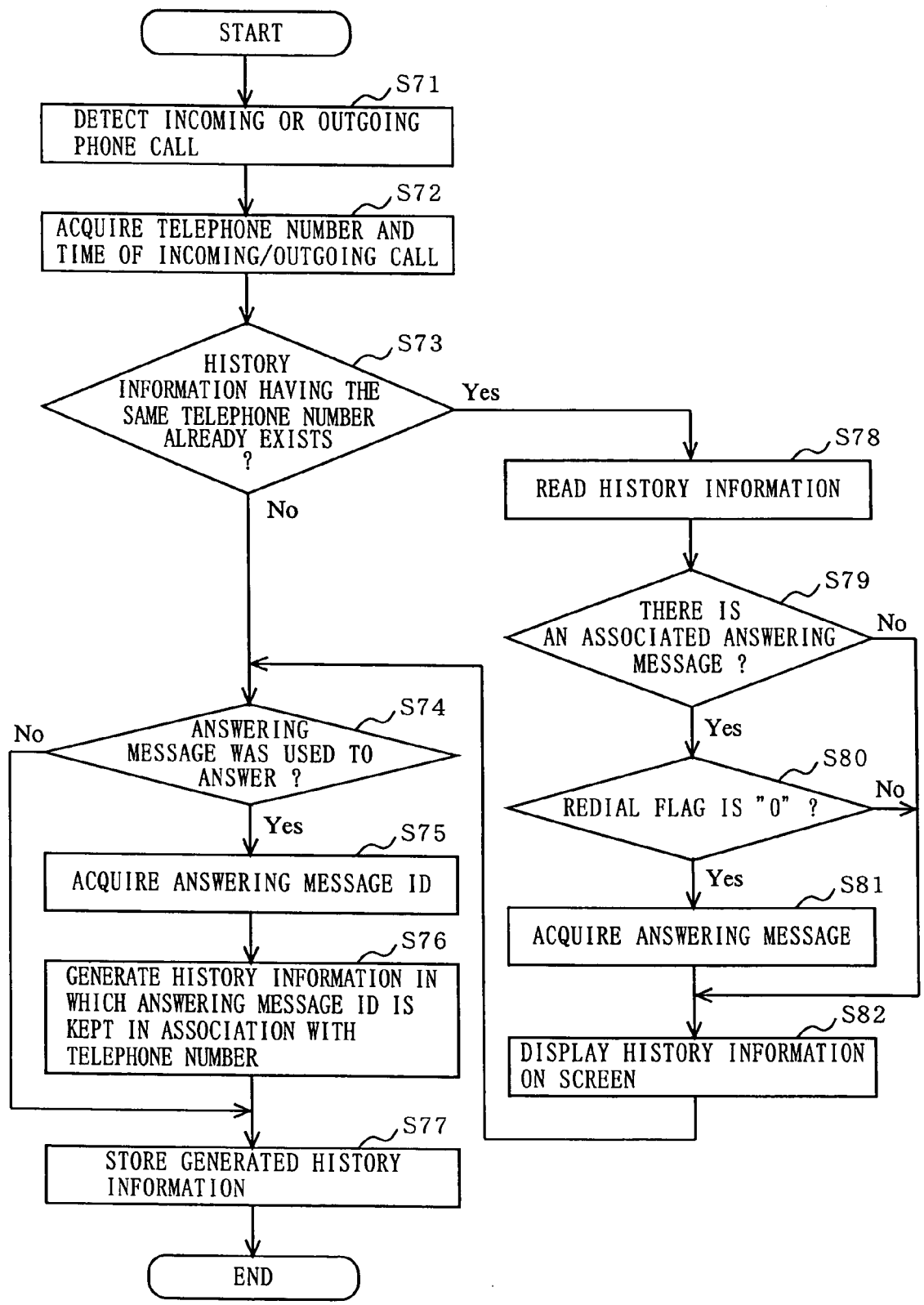
FIG. 7 is a flowchart illustrating processing steps of the incoming/outgoing call history management method according to the second embodiment of the present invention.

FIG. 6 is a diagram illustrating a software structure of a mobile terminal utilizing an incoming/outgoing call history management method according to a second embodiment of the present invention. A program stored in a ROM 22 of FIG. 2 is read by the CPU 21 to realize functions of an incoming/outgoing call detection section 61, an information acquisition section 62, an incoming call history generation section 63, an incoming call history storing section 64, an incoming call history notification section 65, and an answering message storing section 66. FIG. 7 is a flowchart illustrating processing steps of the incoming/outgoing call history management method according to the second embodiment of the present invention.

The incoming/outgoing call detection section 61 detects an incoming phone call to the mobile terminal 10 (step S71). Upon detecting an incoming phone call, the incoming/outgoing call detection section 61 acquires the number (or owner's name) and the time of reception of the phone call (step S72). In response to the detection of an incoming call by the incoming/outgoing call detection section 61, the information acquisition section 62 acquires related information concerning the detected incoming call (step S75). The "related information" as described in the second embodiment is information identifying an answering message which is used to answer an incoming phone call for the user. The answering message may be a voice message as exemplified in FIG. 8. The answering message(s) is previously stored in the answering message storing section 66 by the user A. When using an answering message for answering, the user presses the answering message button 152, in response to which a screen for allowing an answering message to be selected from among the answering messages shown in FIG. 8 is displayed on the screen 12, and the user selects one of the answering messages. If an incoming call is received during a so-called manner mode, such an answering message selection screen may be automatically displayed.

When acquiring an answering message, the information acquisition section 62 determines whether an incoming call detected by the incoming/outgoing call detection section 61 was answered by reproducing a certain answering message (step S74). If the information acquisition section 62 determines that the phone call was answered by reproducing the answering message, the information acquisition section 62 acquires an ID of the answering message from the answering message storing section 66 (step S75).

The incoming call history generation section 63 generates history information, in which the answering message ID acquired by the information acquisition section 62 is kept in association with the telephone number and the time of reception detected by the incoming/outgoing call detection section 61 (step S76). Then, the incoming call history generation section 63 stores the generated history information to the incoming call history storing section 64 (step S77). FIG. 9 is a diagram illustrating examples of incoming call history information which is stored in the incoming call history storing section 64. Data 91 shown in FIG. 9 indicates that a phone call received on Jul. 7, 2004, 18:30, from 090-XXXX-XXXX (owner: SUGI) was answered with an answering message "I am in a regular meeting until 15 o'clock". The incoming call history information includes a redial flag 92 indicating whether the user has called back the telephone number of a given incoming call or not. Note that the redial flag 92 may be set to "redialed" if the person from which an incoming call originated has made another incoming call. Even in the case where an answering message is not used for answering, the telephone number of an incoming call and the time of reception are to be stored together as a piece of incoming call history information, as is well known in the art.

Figure 10:
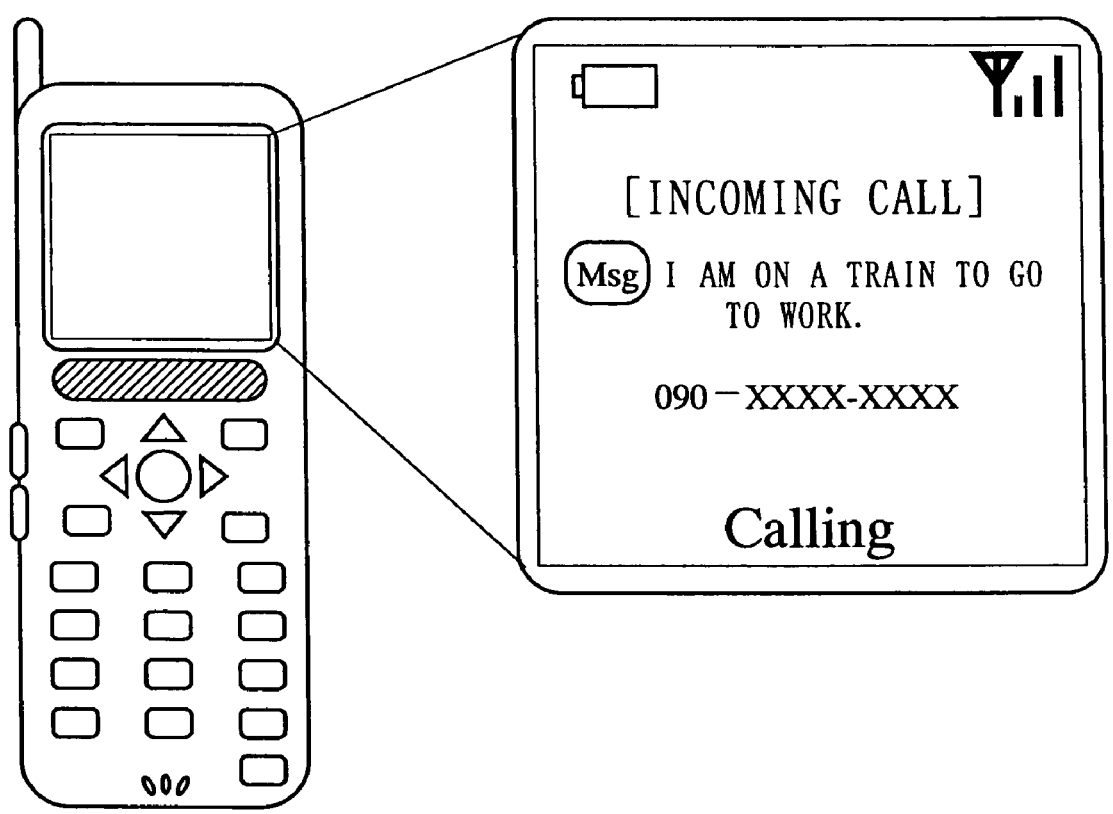
FIG. 10 is a diagram illustrating an example of history information to be displayed on a screen 12.

The history information which has been thus stored may be utilized as follows at the time of an incoming call, for example. If the incoming/outgoing call detection section 61 detects an incoming phone call to the mobile terminal 10 and acquires the telephone number (or owner's name) (steps S71 and S72), the incoming call history notification section 65 checks whether a piece of history information corresponding to this telephone number is already stored in the incoming call history storing section 64 (step S73). If the result of the checking indicates that such a history information already exists, the incoming call history notification section 65 reads the piece of history information from the incoming call history storing section 64, and notifies the content of the information to the user via the screen 12, the loudspeaker 13, or the like (steps S78 and S82). If there is an associated answering message (step S79, Yes), and the redial flag is "0" (i.e., redialing has not been performed yet) (step S80, Yes), the incoming call history notification section 65 acquires the answering message from the answering message storing section 66, and notifies the answering message to the user via the screen 12 or the like (steps S81 and S82). FIG. 10 is a diagram illustrating an example of history information to be displayed on a screen 12. FIG. 10 illustrates an exemplary screen image to be displayed in the case where an answering message "I am on a train to go to work" was reproduced in response to a previous incoming call, and the person (telephone number "090-XXXX-XXXX") with whom the user has never had a chance to talk has called again. Alternatively or additionally to displaying the answering message on the screen in text, the content of the answering message may also be reproduced as audio.

Figure 11:
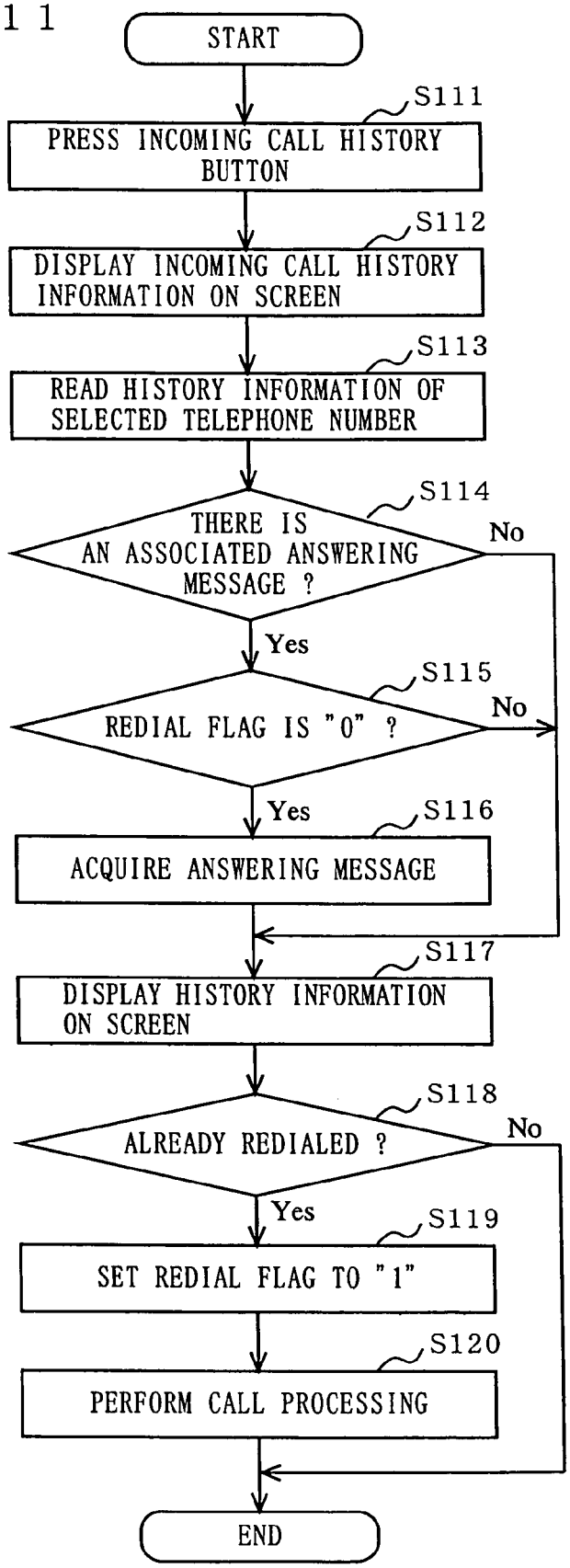
FIG. 11 is another flowchart illustrating processing steps of the incoming/outgoing call history management method according to the second embodiment of the present invention.

The history information may also be utilized as follows in the case of making an outgoing phone call, by referring to the incoming call history, to a person whom the user has answered with an answering message, for example. FIG. 11 is another flowchart illustrating processing steps of the incoming/outgoing call history management method according to the second embodiment of the present invention.

Figure 12:
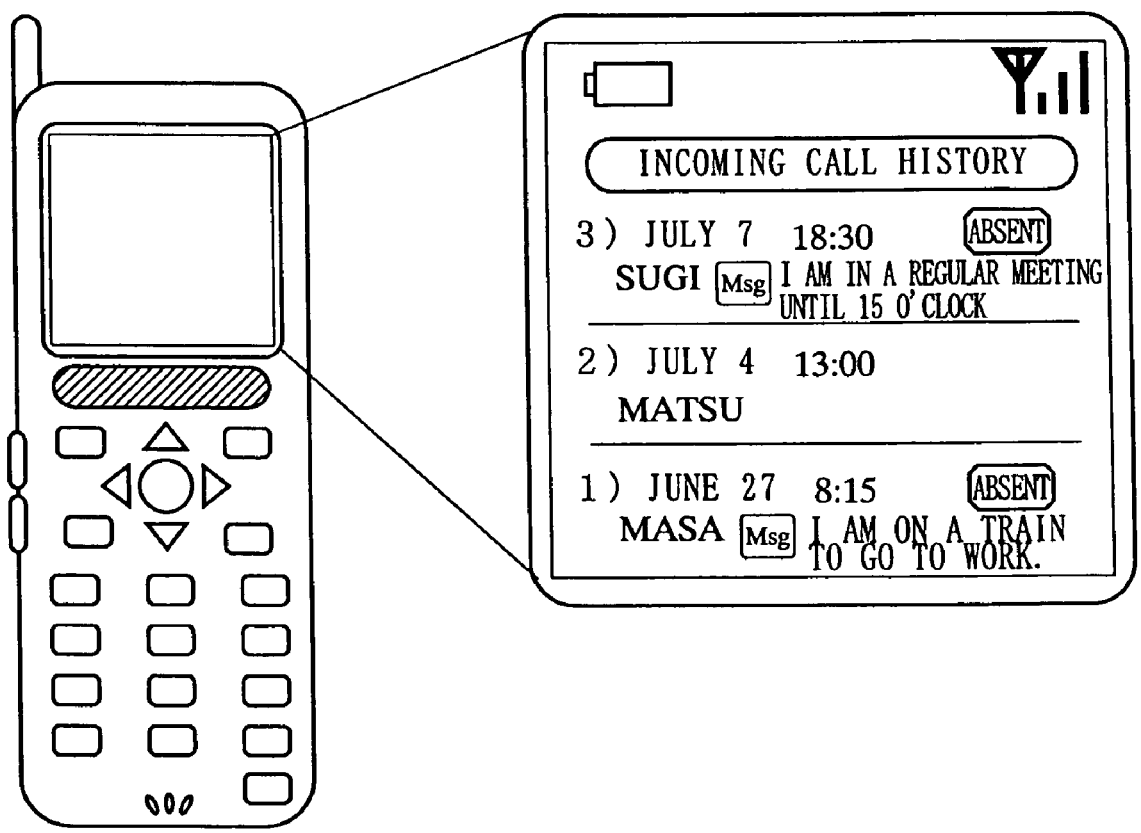
FIG. 12 is a diagram illustrating an example of incoming call history information being listed on the screen 12.

The user wishing to make a phone call presses the incoming/outgoing call history button 153 to cause the incoming call history list as shown in FIG. 12 to be displayed on the screen 12 (steps S111 and S112). If the user selects one of the incoming call history records, the incoming call history notification section 65 reads the history information in the incoming call history record from the incoming call history storing section 64 and displays it on the screen 12, thus notifying the content of the history information to the user (steps S113 and S117). At this time, if there is an associated answering message (step S114, Yes) and the redial flag is "0" (step S115, Yes), the incoming call history notification section 65 acquires the answering message from the answering message storing section 66 and displays it on the screen 12 (steps S116 and S117). Then, if the user who has confirmed the content of the incoming call history proceeds to make a phone call (step S118, Yes), the incoming call history generation section 63 sets "1" in the redial flag (step S119), and thereafter performs call processing (step S120).

Thus, in accordance with the incoming/outgoing call history management method of the second embodiment, an answering message is stored in association with an incoming phone call. As a result, the user can easily check which answering message was used to answer a previous incoming phone call, thus preventing himself or herself from making an improper response at the next call, thereby making for a smooth dialog.

Third Embodiment

In a third embodiment of the present invention, alarming information is additionally included in the answering message according to the second embodiment. The process spanning from detection of an incoming call to storage of history information which is performed in the incoming/outgoing call history management method according to the third embodiment is basically the same as that in the incoming/outgoing call history management method according to the second embodiment, with the only difference being a portion concerning an alarming process. Therefore, like reference numerals are provided for like elements and like process steps, and the descriptions thereof are omitted. Hereinafter, the difference will be mainly described.

Figure 13:
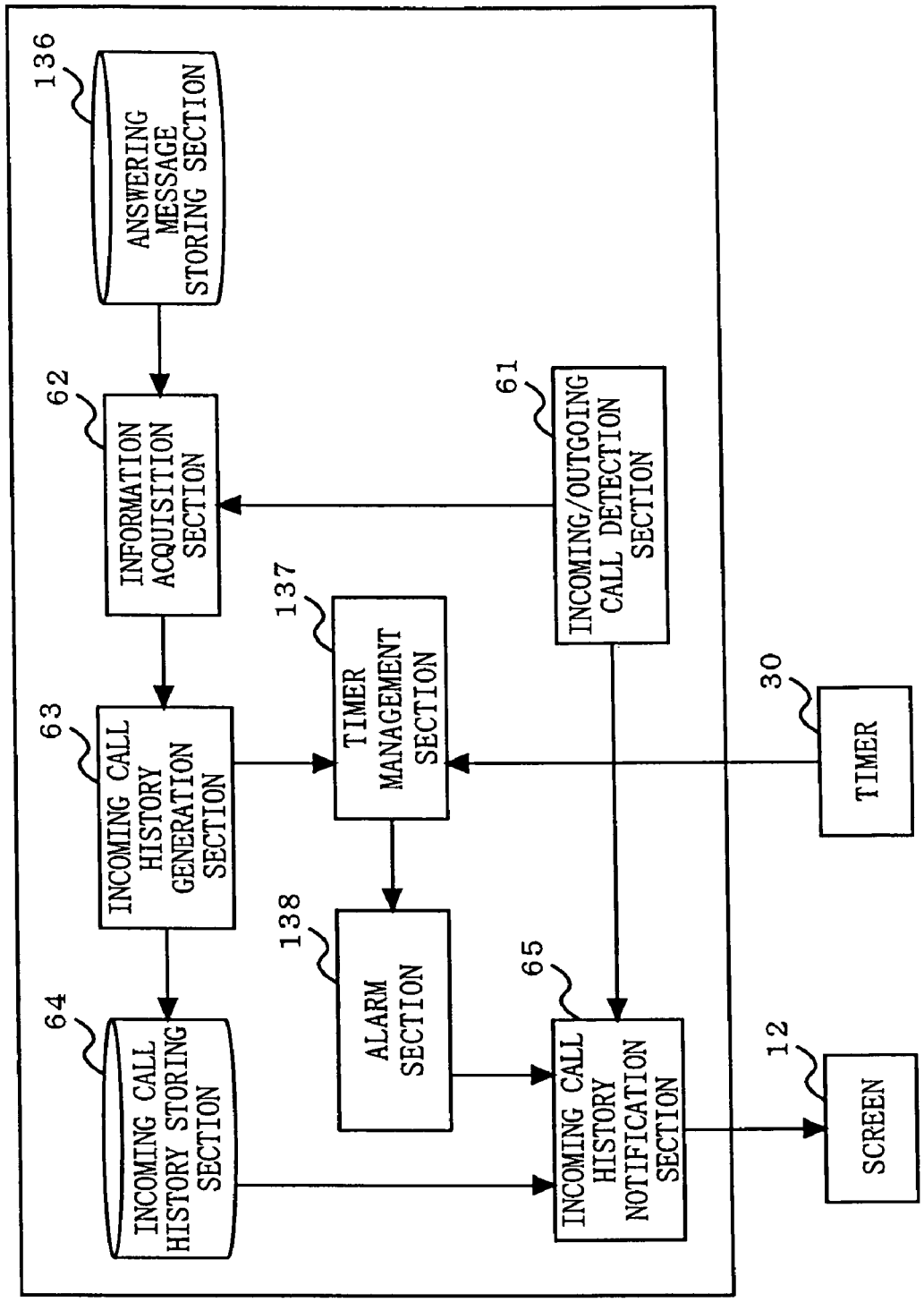
FIG. 13 is a diagram illustrating a software structure of a mobile terminal utilizing an incoming/outgoing call history management method according to a third embodiment of the present invention.
Figure 15:
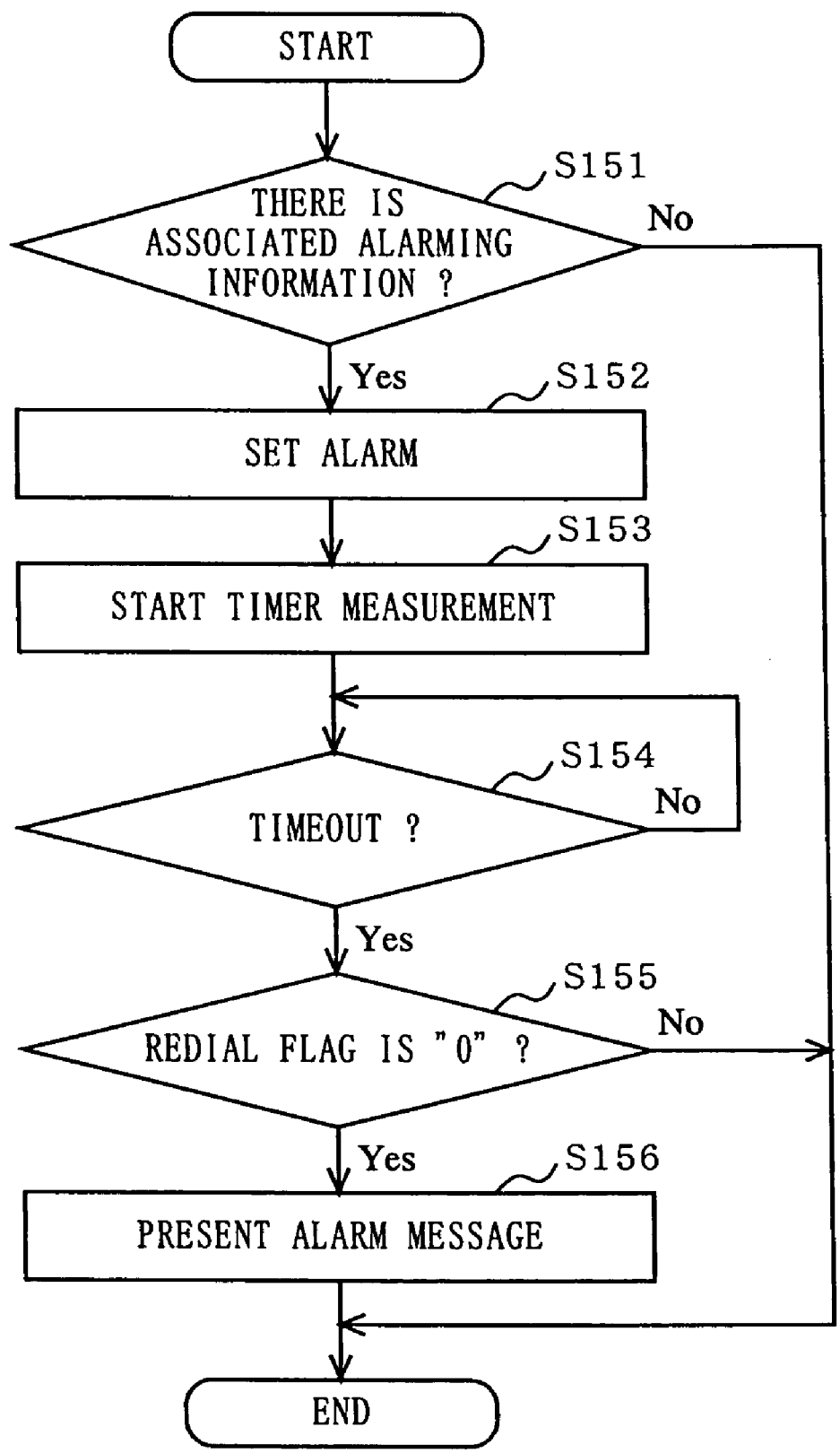
FIG. 15 is a flowchart illustrating processing steps of the incoming/outgoing call history management method according to the third embodiment of the present invention.

FIG. 13 is a diagram illustrating a software structure of a mobile terminal utilizing the incoming/outgoing call history management method according to the third embodiment of the present invention. A program stored in the ROM 22 of FIG. 2 is read by the CPU 21 to realize functions of an incoming/outgoing call detection section 61, an information acquisition section 62, an incoming call history generation section 63, an incoming call history storing section 64, an incoming call history notification section 65, an answering message storing section 136, an timer management section 137, and an alarm section 138. FIG. 15 is a flowchart illustrating processing steps of the incoming/outgoing call history management method according to the third embodiment of the present invention.

In the answering message storing section 136, alarming information (an alarming date, an alarming time, and an alarming method) is previously set in association with each content of an answering message (FIG. 14). In the example shown in FIG. 14, an alarming time "5 minutes later" (i.e., an alarm goes off 5 minutes after answering) and an alarming method "play sound effect 2 and present an animation" are set in association with an answering message "Let me call you back right away" in the answering message data 141. Answering message data 143 indicates that an alarming date "Jul. 11, 2004", an alarming time "15:30", and an alarming method "melody 5" are set in association with an answering message "I am in a regular meeting until 15 o'clock". Answering message data 144 indicates that an alarming time "8:40" and an alarming method "vibration 1" are set in association with an answering message "I am on a train to go to work".

When incoming call history information is generated in the incoming call history generation section 63, the timer management section 137 checks the alarming information which is in the history (step S151), and sets an alarm based on that information (step S152). Thereafter, the timer management section 137 starts timer measurement (step S153). If the timer has reached timeout (i.e., reached the alarming date and the alarming time), timer management section 137 notifies so to the alarm section 138 (step S154).

Figure 16:
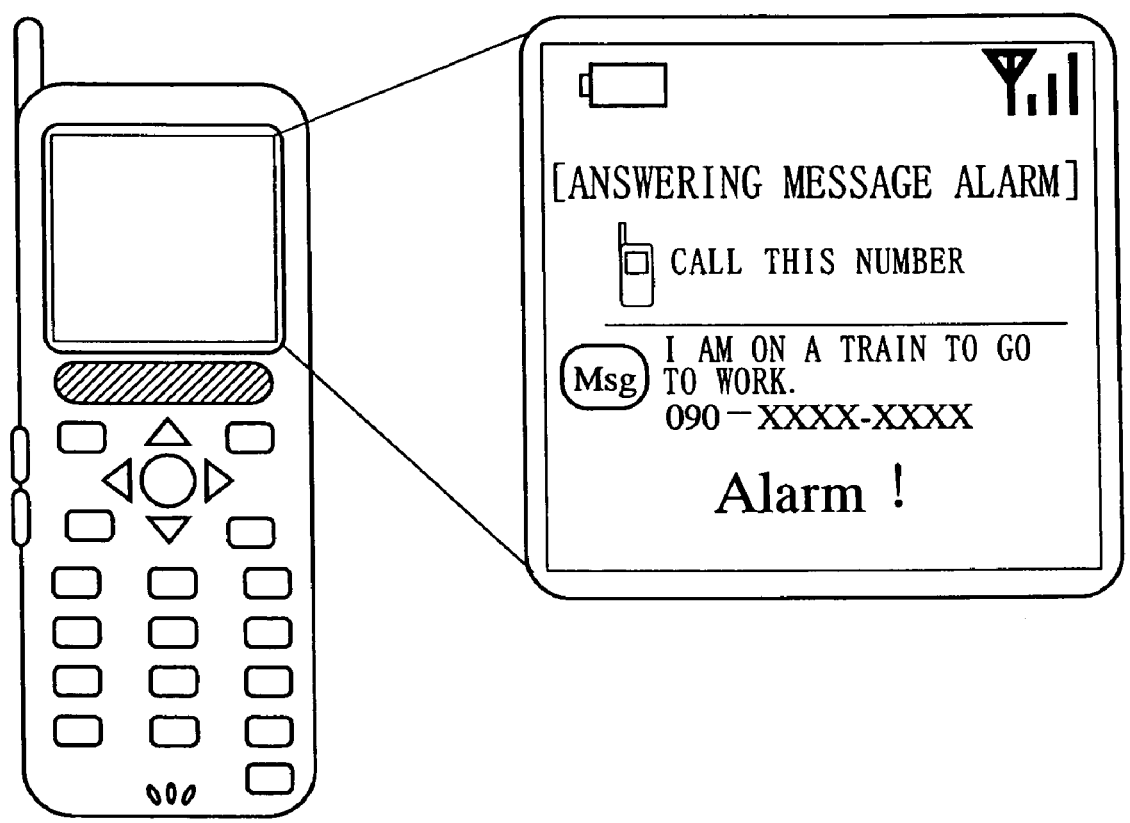
FIG. 16 is a diagram illustrating an example of alarm information as notified on the screen 12.

Upon receiving the above notification, the alarm section 138 refers to the incoming call history storing section 64 to check the redial flag in the incoming call history record for which the alarming time has reached timeout (step S155). Then, if the redial flag is "0", the alarm section 138 instructs the incoming call history notification section 65 to notify with an alarm according to the alarming method (step S156). FIG. 16 is a diagram illustrating an exemplary screen image presented by the incoming call history notification section 65 in accordance with an instruction from the alarm section 138. FIG. 16 illustrates a case where an answering message alarm "call this number" is being displayed because the user has not redialed, by the time "8:40" at which the alarm is set, to a person whom the user previously answered with an answering message "I am on a train to go to work" (telephone number "090-XXXX-XXXX").

Thus, in accordance with the incoming/outgoing call history management method of the third embodiment, an arbitrary alarm is set and stored with respect to an answering message. For any incoming call history record for which an alarm is set, the content of the history record is automatically displayed when the alarming time is reached, unless the user has already redialed. As a result, it becomes possible to prevent failure to redial to a person to which an answering message was sent.

Fourth Embodiment

Usually, there is a limit to the maximum number of pieces of incoming/outgoing call history information that can be stored. Once this maximum number is exceeded, it is general practice to delete the history information one after another, the older ones first, based on the time of reception/calling.

Therefore, it may be possible for a piece of history information to be deleted before the user has a chance to confirm its content.

Therefore, in a fourth embodiment of the present invention, an incoming/outgoing call history management method is described which performs deletion of history by utilizing the redial flag according to the second and third embodiments. The method of setting the redial flag, etc., is similar to those described in the above embodiments.

Figure 17:
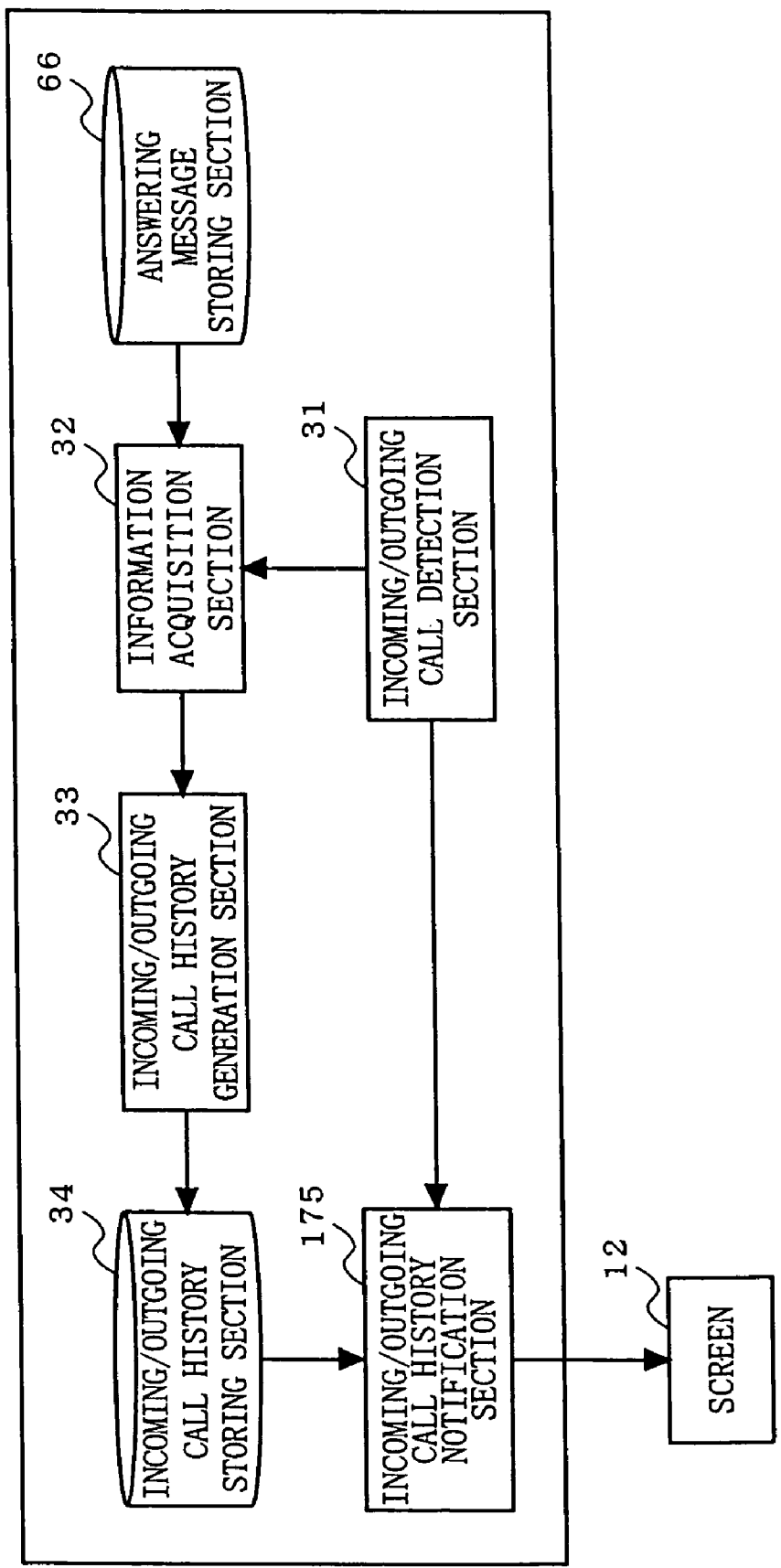
FIG. 17 is a diagram illustrating a software structure of a mobile terminal utilizing an incoming/outgoing call history management method according to a fourth embodiment of the present invention.
Figure 18:
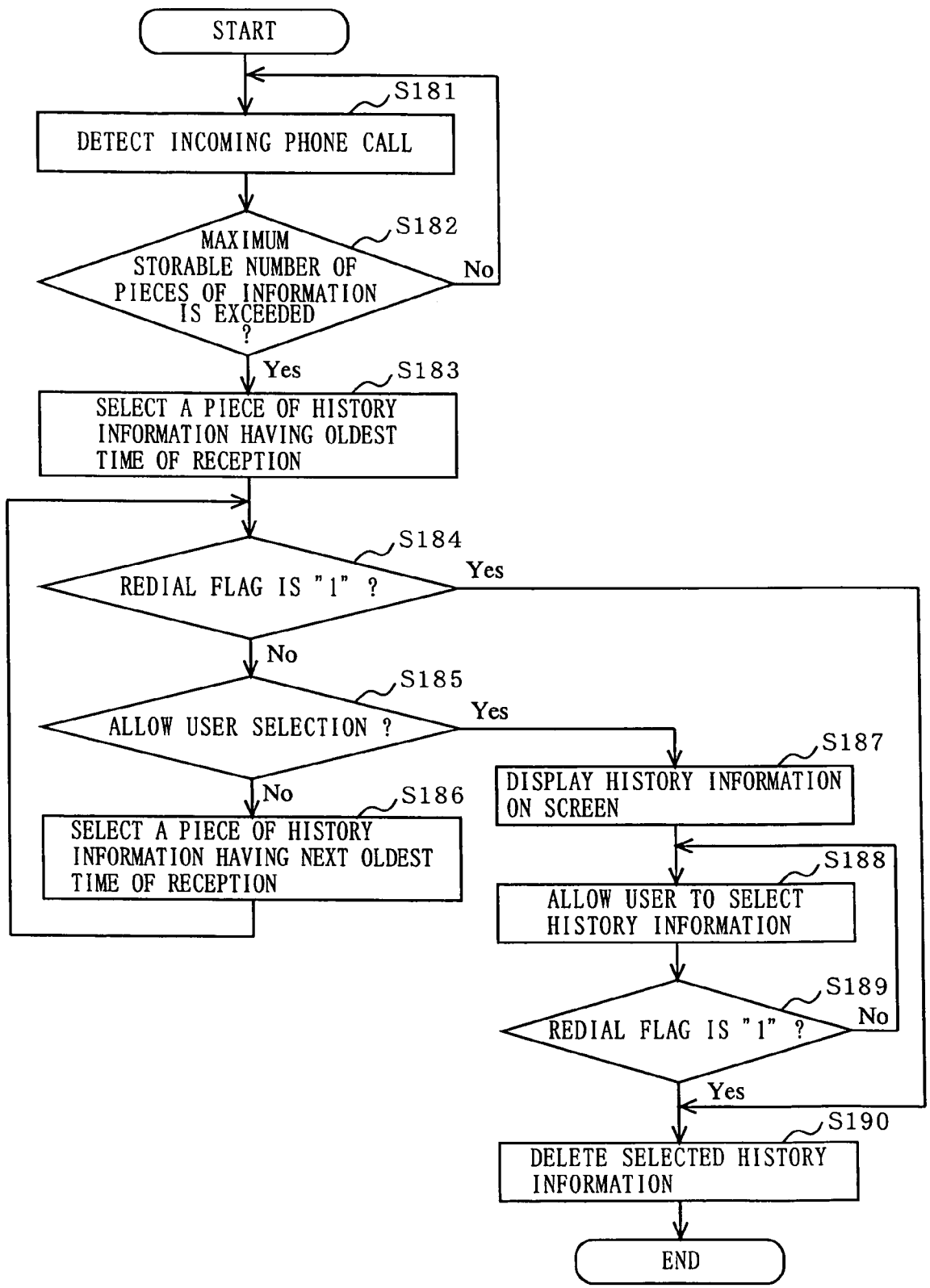
FIG. 18 is a flowchart illustrating processing steps of the incoming/outgoing call history management method according to the fourth embodiment of the present invention.

FIG. 17 is a diagram illustrating a software structure of a mobile terminal utilizing the incoming/outgoing call history management method according to the fourth embodiment of the present invention. A program stored in the ROM 22 of FIG. 2 is read by the CPU 21 to realize functions of an incoming/outgoing call detection section 31, an information acquisition section 32, an incoming/outgoing call history generation section 33, an incoming/outgoing call history storing section 34, and an incoming/outgoing call history notification section 175. Those component elements which are denoted by the same reference numerals as those used in the above embodiments perform the respectively corresponding processes, and the descriptions thereof are omitted. Although the present embodiment is described with respect to the case of an incoming phone call, similar processes are also to be performed in the case of an outgoing phone call. FIG. 18 is a flowchart illustrating processing steps of the incoming/outgoing call history management method according to the fourth embodiment of the present invention.

If a new incoming phone call results in the maximum storable number of pieces of incoming call history information being exceeded (steps S181 and S182), the incoming/outgoing call history notification section 175 selects a piece of incoming call history information that has the oldest time of reception (step S183). Then, the incoming/outgoing call history notification section 175 checks whether the redial flag of the selected incoming call history information is "1" (step S184). If the result of the checking indicates that the redial flag is "1", the incoming/outgoing call history notification section 175 deletes the selected piece of incoming call history information, and ends the process (step S190). On the other hand, if the redial flag is "0", the incoming/outgoing call history notification section 175 asks the user whether or not to select a piece of incoming call history information to be deleted (step S185). If the user does not wish to select a piece of incoming call history information to be deleted, the incoming/outgoing call history notification section 175 selects a piece of incoming call history information having the next oldest time of reception (step S186), and repeats the processes of step S184 and the subsequent steps.

Figure 19:
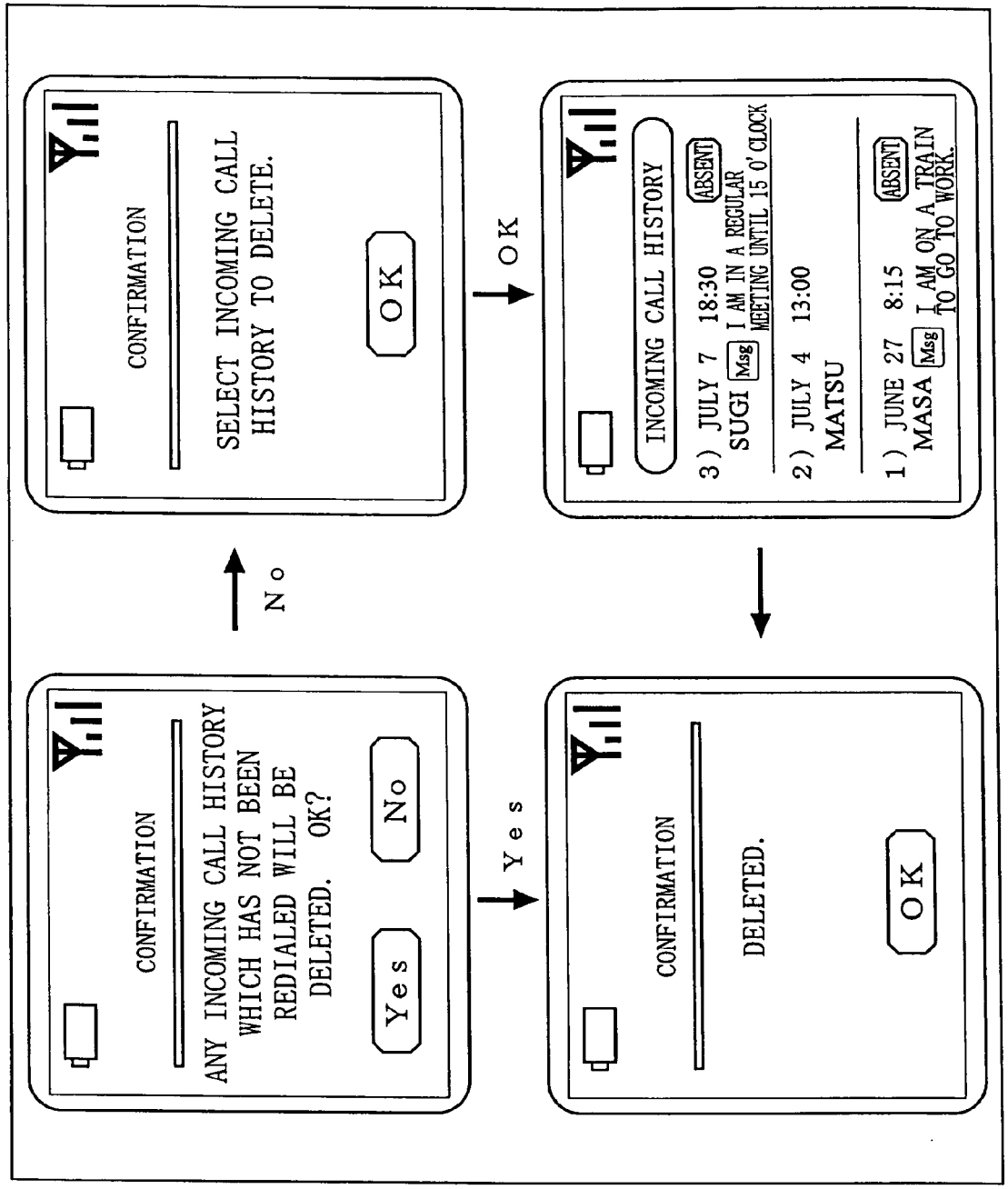
FIG. 19 is a diagram illustrating an exemplary history deletion process to be displayed on the screen 12.

If the user wishes to select a piece of incoming call history information to be deleted, the incoming/outgoing call history notification section 175 displays all pieces of incoming call history information that are stored on the screen 12 to prompt the user to make a selection (step S187). Then, if the user selects a piece of incoming call history information to be deleted, the incoming/outgoing call history notification section 175 checks whether the redial flag of the selected piece of incoming call history information is "1" (steps S188 and S189). If the redial flag is "0", the incoming/outgoing call history notification section 175 reconfirms whether the deletion may really be made, and, if necessary, prompts the user to make a selection again. Upon receiving the user's approval to delete the selected piece of incoming call history information, the incoming/outgoing call history notification section 175 deletes the piece of incoming call history information, and ends the process (step S190). FIG. 19 is a diagram illustrating an exemplary image to be displayed on the screen 12 through the processes of steps S187 to S190.

Thus, in accordance with the incoming/outgoing call history management method of the fourth embodiment, any piece of incoming call history information pertaining to a person to whom the user has not redialed yet can be prevented from being automatically deleted, thereby protecting that piece of incoming call history.

Note that, among the functional blocks of the mobile terminal according to the present invention, the incoming/outgoing call detection section 31, information acquisition section 32, incoming/outgoing call history generation section 33, and the incoming/outgoing call history notification section 35 may typically be realized as an LSI, which is an integrated circuit (which may be referred to as an IC, a system LSI, a super LSI, or an ultra LSI, etc., depending on the degree of integration) (see FIG. 3). Each functional block may be separately constructed in a chip form, or all or some of the functional blocks may be constructed in a chip form.

Also, the method of integration is not limited to LSI, and may be realized by a dedicated circuit or a general purpose processor. Also, an FPGA (Field Programmable Gate Array), which is an LSI that can be programmed after manufacture, or a reconfigurable processor enabling connections and settings of the circuit cells in the LSI to be reconfigured may be used.

Further, in the case where another integration technology replacing LSI becomes available due to improvement of a semiconductor technology or due to the emergence of another technology derived therefrom, integration of the functional blocks may be performed using such a new integration technology. For example, biotechnology may be applied to the above-described integration.

Also note that the incoming/outgoing call history management method according to the present invention can be realized by a CPU interpreting and executing program data, which is able to cause a CPU to execute the above-described processing steps, stored in a storage device (e.g., a ROM, a RAM, or a hard disk). In this case, the program data may be introduced into the storage device from a recording medium such as a CD-ROM or a flexible disk, or may be directly executed from the recording medium.

INDUSTRIAL APPLICABILITY

The mobile terminal and the incoming/outgoing call history management method according to the present invention can be employed for, for example, the management of an incoming/outgoing call history of phone calls exchanged with another mobile terminal, particularly in the case where it is desirable to conduct a smooth dialog at a forthcoming incoming/outgoing call by referring to information related to a previous incoming/outgoing call, for example.

The invention claimed is:

1. A mobile terminal having a communication function, the mobile terminal comprising:
a detection section configured to detect an incoming or outgoing phone call; an information acquisition section to acquire related information concerning an incoming or outgoing phone call in response to detection of the incoming or outgoing phone call by the detection section;
a device section configured to acquire environment information in response to detection of the incoming or outgoing phone call by the detection section, the environmental information being at least one of a still image of surroundings of the mobile terminal acquired with a camera, moving pictures of the surroundings of the mobile terminal acquired with a camera, sounds and soundscape of the surroundings of the mobile terminal acquired with a microphone, a channel which is being viewed in the mobile terminal acquired with an internal television tuner, and open/close information concerning at least one of a state of folding, rotating, and sliding of the mobile terminal acquired by the information acquisition section;

a history generation section configured to generate history information in which the related information acquired by the information acquisition section and the environment information acquired by the device section are kept in association with at least a telephone number of the incoming or outgoing phone call as a piece of the history information;

a history storing section configured to store the history information generated by the history generation section; and a history notification section configured to notify a user of the mobile terminal of the related information and the environment information contained in the piece of the history information, in response to an incoming or outgoing phone call from or to the telephone number contained in the piece of the history information stored in the history storing section.

2. The mobile terminal according to claim 1, further comprising a message storing section configured to store a plurality of answering messages, wherein, the information acquisition section is configured to acquire from the message storing section an answering message used to answer the incoming phone call as the related information, and the history storing section is configured to store the answering message acquired by the information acquisition section in association with the telephone number of the incoming phone call.

3. The mobile terminal according to claim 2, wherein, the history storing section is further configured to store information indicating whether or not the telephone number contained in the piece of the history information has been redialed, and at a time of the incoming or outgoing phone call, the history notification section is configured to notify the user of the answering message associated with the piece of the history information containing the telephone number only if the telephone number has not yet been redialed.

4. The mobile terminal according to claim 3, wherein, the message storing section is further configured to store alarm information specifying a time at which to notify with an alarm in connection with the answering message, and the history notification section is configured to notify the user of the answering message associated with the piece of the history information which contains the telephone number that has not yet been redialed and which has reached the time specified by the alarm information.

5. The mobile terminal according to claim 3, wherein, if a number of pieces of the history information stored in the history storing section exceeds a predetermined maximum number, the history notification section is configured to automatically delete a piece of the history information which contains an already redialed telephone number and which has an oldest time of reception/calling.

6. The mobile terminal according to claim 3, wherein, when a piece of the history information which contains a telephone number that has not yet been redialed is nominated for deletion, the history notification section is configured to present a message to the user to seek an approval to delete the piece of the history information.

7. The mobile terminal according to claim 2, wherein, the message storing section is further configured to store alarm information specifying a time at which to notify with an alarm in connection with the answering message, and the history notification section is configured to notify the user of the answering message associated with the piece of the history information which has reached the time specified by the alarm information.

8. An incoming/outgoing call history management method for managing a communication history of a mobile terminal, the incoming/outgoing call history management method comprising:

detecting an incoming or outgoing phone call from or to another mobile terminal;

acquiring related information concerning an incoming or outgoing phone call in response to detection of the incoming or outgoing phone call;

acquiring environment information in response to detection of the incoming or outgoing phone call, the environmental information being at least one of a still image of surroundings of the mobile terminal acquired with a camera, moving pictures of the surroundings of the mobile terminal acquired with a camera, sounds and soundscape of the surroundings of the mobile terminal acquired with a microphone, a channel which is being viewed in the mobile terminal acquired with an internal television tuner, and open/close information concerning at least one of a state of folding, rotating, and sliding of the mobile terminal acquired by the acquisition of the related information;

generating history information in which the related information and the environment information are kept in association with at least a telephone number of the incoming or outgoing phone call as a piece of the history information;

storing the generated history information; and notifying a user of the mobile terminal of the related information and the environment information contained in the piece of the history information, in response to an incoming or outgoing phone call from or to the telephone number contained in the piece of the stored history information.

9. A computer-readable medium encoded with a computer-readable program for causing a mobile terminal to perform an incoming/outgoing call history management method for managing an incoming/outgoing call history of the mobile terminal, the program causing the mobile terminal to execute:

detecting an incoming or outgoing phone call from or to another mobile terminal;

acquiring related information concerning an incoming or outgoing phone call in response to detection of the incoming or outgoing phone call;

acquiring environment in response to detection of the incoming or outgoing phone call, the environmental information being at least one of a still image of surroundings of the mobile terminal acquired with a camera, moving pictures of the surroundings of the mobile terminal acquired with a camera, sounds and soundscape of the surroundings of the mobile terminal acquired with a microphone, a channel which is being viewed in the mobile terminal acquired with an internal television tuner, and open/close information concerning at least one of a state of folding, rotating, and sliding of the mobile terminal acquired by the acquisition of the related information;

generating history information in which the related information and the environment information are kept in association with at least a telephone number of the incoming or outgoing phone call as a piece of the history information;

storing the generated history information; and notifying a user of the mobile terminal of the related information and the environment information contained in the piece of the history information, in response to an incoming or outgoing phone call from or to the telephone number contained in the piece of the stored history information.

10. An integrated circuit for a mobile terminal having a communication function, the integrated circuit comprising circuitry functioning as:

a detection section configured to detect an incoming or outgoing phone call;

an information acquisition section configured to acquire related information concerning an incoming or outgoing phone call in response to detection of the incoming or outgoing phone call by the detection section;

a device section configured to acquire environment information in response to detection of the incoming or outgoing phone call by the detection section, the environmental information being at least one of a still image of surroundings of the mobile terminal acquired with a camera, moving pictures of the surroundings of the mobile terminal acquired with a camera, sounds and soundscape of the surroundings of the mobile terminal acquired with a microphone, a channel which is being viewed in the mobile terminal acquired with an internal television tuner, and open/close information concerning at least one of a state of folding, rotating, and sliding of the mobile terminal acquired by the information acquisition section;

a history generation section configured to generate history information in which the related information acquired by the information acquisition section and the environment information acquired by the device section are kept in association with at least a telephone number of the incoming or outgoing phone call as a piece of the history information;

a history storing section configured to store the history information generated by the history generation section; and a history notification section configured to notify to a user of the mobile terminal of the related information and the environment information contained in the piece of the history information, in response to an incoming or outgoing phone call from or to the telephone number contained in the piece of the history information stored in the history storing section.

* * * * *